(12) United States Patent
Parker et al.

(10) Patent No.: US 7,628,580 B2
(45) Date of Patent: Dec. 8, 2009

(54) VARIABLE GEOMETRY TURBINE

(75) Inventors: John Frederick Parker, West Yorkshire (GB); Stephen Edward Garrett, Huddersfield (GB)

(73) Assignee: Holset Engineering Company, Limited, Huddersfield (GB)

(*) Notice: Subject to any disclaimer, the term of this patent is extended or adjusted under 35 U.S.C. 154(b) by 396 days.

(21) Appl. No.: 11/101,707

(22) Filed: Apr. 8, 2005

(65) Prior Publication Data

US 2005/0260067 A1  Nov. 24, 2005

(30) Foreign Application Priority Data

Apr. 8, 2004  (GB)  ................... 0407978.6

(51) Int. Cl.
*F01D 17/16* (2006.01)
(52) U.S. Cl. ...................................... 415/164; 417/407
(58) Field of Classification Search ................. 417/407; 416/160, 164; 415/160, 164
See application file for complete search history.

(56) References Cited

U.S. PATENT DOCUMENTS

| | | | |
|---|---|---|---|
| 3,495,921 A | 2/1970 | Swearingen | |
| 4,130,989 A | 12/1978 | Wirth et al. | |
| 4,502,836 A * | 3/1985 | Swearingen | ................. 415/150 |
| 4,880,351 A | 11/1989 | Inoue et al. | |
| 6,419,464 B1 * | 7/2002 | Arnold | ........................ 417/407 |

FOREIGN PATENT DOCUMENTS

| | | |
|---|---|---|
| EP | 1 197 637 A2 | 4/2002 |
| GB | 731822 | 6/1955 |
| JP | 2002-364374 | 12/2002 |
| WO | WO 2004/036010 | 4/2004 |

\* cited by examiner

*Primary Examiner*—Christopher Verdier
(74) *Attorney, Agent, or Firm*—Krieg DeVault LLP; J. Bruce Schelkopf, Esq.

(57) ABSTRACT

A variable geometry turbine comprises a housing defining a chamber within which a turbine wheel is mounted. The chamber has an annular inlet having a width defined between side walls of the housing. An array of vanes is mounted within the inlet, each vane having a length extending across the inlet, and a chordal length defined between leading and trailing vane edges. The vanes can be pivoted to adjust the effective cross-section area of the annular inlet. Each vane is pivotable between a first position in which the area of the inlet is a minimum and a second position in which the area of the inlet is a maximum. At least one of the side walls is configured so that clearance between the side wall and at least a portion of the adjacent chordal edge of each vane varies in a predetermined manner as the vane moves.

17 Claims, 10 Drawing Sheets

VARIABLE GEOMETRY TURBINE

The present application claims priority to British Patent Application No. 0407978.6 filed Apr. 8, 2004, which is incorporated herein by reference.

The present invention relates to a variable geometry turbine, and in particular to a turbine of a type suitable for use in a turbocharger for an internal combustion engine. More particularly still, the invention provides advantages in turbochargers intended for internal combustion engines which have an exhaust gas re-circulation (EGR) system.

Turbines generally comprise a turbine housing defining a chamber within which a turbine wheel is mounted. The turbine chamber an annular inlet passageway arranged around the periphery of the turbine wheel and surrounded by an annular inlet chamber (volute). An outlet passageway extends from the turbine chamber, generally along the axis of rotation of the turbine wheel.

Variable geometry turbines, having a variable geometry inlet passageway, are well known. In one common type of variable geometry turbine, one wall of the inlet passageway is defined by a moveable wall member, generally termed "nozzle ring", the position of which relative to a facing wall of the inlet passageway is adjustable to control the width of the inlet passageway. The inlet passageway width, and thus the geometry of the turbine, is varied so that as the volume of gas flowing through the turbine decreases the inlet passageway width may also be decreased to maintain gas velocity and hence turbine efficiency.

It is also well known to improve turbine efficiency by providing the nozzle ring with vanes, referred to as nozzle vanes, which extend across the inlet passageway so as to deflect gas flowing through the inlet passageway towards the direction of rotation of the turbine wheel (similarly it is known to provide fixed geometry turbines with fixed nozzle vanes).

Another common form of variable geometry turbine is the "swing vane" type. This comprises an array of moveable vanes located in the turbine inlet passageway, each vane being pivotable about a respective axis extending across the inlet parallel to the turbine axis (and generally aligned with a point approximately half way along the vane length—measured circumferentially). A vane actuating mechanism is provided which is linked to each of the vanes and is displaceable in a manner which causes each of the vanes to move in unison, such a movement enabling the cross-sectional area available for the incoming gas, and also the angle of approach of the gas to the turbine wheel, to be controlled. For instance, orientating the vanes so that their chords are generally radial to the wheel increases the spacing between adjacent vanes, thus increasing the cross-sectional flow area of the passageway—referred to as the turbine "throat". On the other hand, pivoting the vanes so that their chords extend generally circumferentially to the wheel reduces the space between adjacent vanes thus reducing the turbine throat. The product of the throat dimension and the fixed axial length of the vanes extending across the inlet passageway, determines the flow rate for any given vane angle.

In swing vane turbochargers typically each vane is mounted on a pivot axle, the axle projecting through a wall of the inlet and supporting outside the inlet a crank or lever. The crank of each vane is coupled to an actuator ring which extends around the turbocharger housing generally outside the inlet but adjacent the vane cranks. The actuator ring is generally referred to as a unison ring. The unison ring is coupled either directly to the vane cranks or by links which provide for relative movement between interconnected components. Various different actuating mechanisms, and linking arrangements, have been proposed in the prior art, including a flexible link arrangement disclosed in the current applicants European patent application 1197637.

Variable geometry turbines are now commonly included in turbochargers which are well known devices for supplying air to the intake of an internal combustion engine at pressures above atmospheric (boost pressures). A conventional turbocharger essentially comprises an exhaust gas driven turbine wheel mounted on one end of a rotatable turbo shaft within a turbine housing. Rotation of the turbine wheel rotates a compressor wheel mounted on the other end of the turbo shaft within a compressor housing. The compressor wheel delivers compressed air to the engine intake manifold. The turbo shaft is conventionally supported by journal and thrust bearings, including appropriate lubricating systems, located within a central bearing housing connected between the turbine and compressor wheel housings.

The use of variable geometry turbines in turbochargers has become particularly important as the general thrust of turbine development has been to maximise turbine efficiency, either to extract the maximum boost pressure from the exhaust gas pressure available, or to achieve a required boost pressure for a minimum exhaust manifold back pressure. For instance, in a swing vane type variable geometry turbine, when the volume of exhaust gas being delivered to the turbine is relatively low the velocity of the gas reaching the turbine wheel can be maintained at a level which ensures efficient turbine operation by narrowing the throat width between adjacent vanes. As the throat is narrowed, for any given volume of gas flow, the velocity of the gas passing through the turbine inlet passageway increases. Conversely, when the volume of gas delivered to the turbine is relatively high the velocity of the gas reaching the turbine wheel can be reduced by opening the throat width between vanes. This reduces the back pressure on the engine whilst simultaneously reducing the pressure of the boost charge air delivered to the engine and thus keep it operating in its optimum range with regard to power output, fuel efficiency, or pollutant emissions.

It has recently been recognised that maximising turbine efficiency can lead to operational problems in some applications. For example, if the turbine is to be included in a turbocharger intended for use with an internal combustion engine having an exhaust gas re-circulation (EGR) system, high peak efficiency can be disadvantageous. In an EGR system a portion of the exhaust gas taken from the exhaust manifold is re-introduced into the inlet manifold of the engine for further combustion with a view to reducing engine emissions. With modern highly efficient variable geometry turbine designs the boost pressure at the inlet manifold can often exceed the exhaust gas pressure at the exhaust manifold making the re-introduction of exhaust gas to the inlet manifold problematical, for instance requiring dedicated EGR pumps etc. A high exhaust manifold pressure can be brought about by closing down the nozzles of a swing vane turbine to decrease the throat. However, with a highly efficient turbine this can result in an even higher inlet manifold pressure due to the increase in boost pressure that is generated. This can result in engine cylinder pressures approaching or exceeding acceptable limits.

The efficiency of the turbine varies depending upon the instantaneous running conditions of the turbine, including mass flow, pressure and temperature. In view of the above problems, it has been recognised that under some operating conditions it is beneficial to reduce the efficiency of the turbine, in particular to drive EGR flow. The applicant's European patent application 1353040 addresses this problem in relation to a variable geometry turbine of the nozzle ring type mentioned above. Specifically, nozzle vanes carried by the moveable nozzle ring are profiled so that peak efficiency is reduced without any significant effect on the efficiency at low flow and maximum flow conditions.

It is an object of the present invention to provide a swing vane variable geometry turbine in which turbine efficiency is tailored to address problems and disadvantages mentioned above.

According to the present invention there is provided a variable geometry turbine comprising:

a turbine housing defining a turbine chamber within which a turbine wheel is mounted for rotation about a turbine axis;

the turbine chamber having a radially extending annular inlet defined between facing annular side walls of the turbine housing, the annular inlet having an axial width defined between said annular side walls;

an annular array of swing vanes mounted within the inlet, each vane having an axial length extending across the inlet between chordal vane edges lying adjacent respective annular side walls of the annular inlet, and a chordal length defined between leading and trailing vane edges extending across the inlet upstream and downstream respectively having regard to direction of flow through the turbine;

means for pivoting each vane about a respective pivot axis extending across the inlet to adjust the effective cross-section area of the annular inlet, each vane being pivotable between a first position in which the area of the inlet is a minimum and a second position in which the area of the inlet is a maximum;

wherein at least one of said annular side walls is configured so that clearance between said side wall and at least a portion of the adjacent chordal edge of each vane varies in a predetermined manner as the vane moves between positions intermediate said first and second vane positions.

Specific embodiments of the present invention will now be described, by way of example only, with reference to the accompanying drawings, in which.

Figure 2:
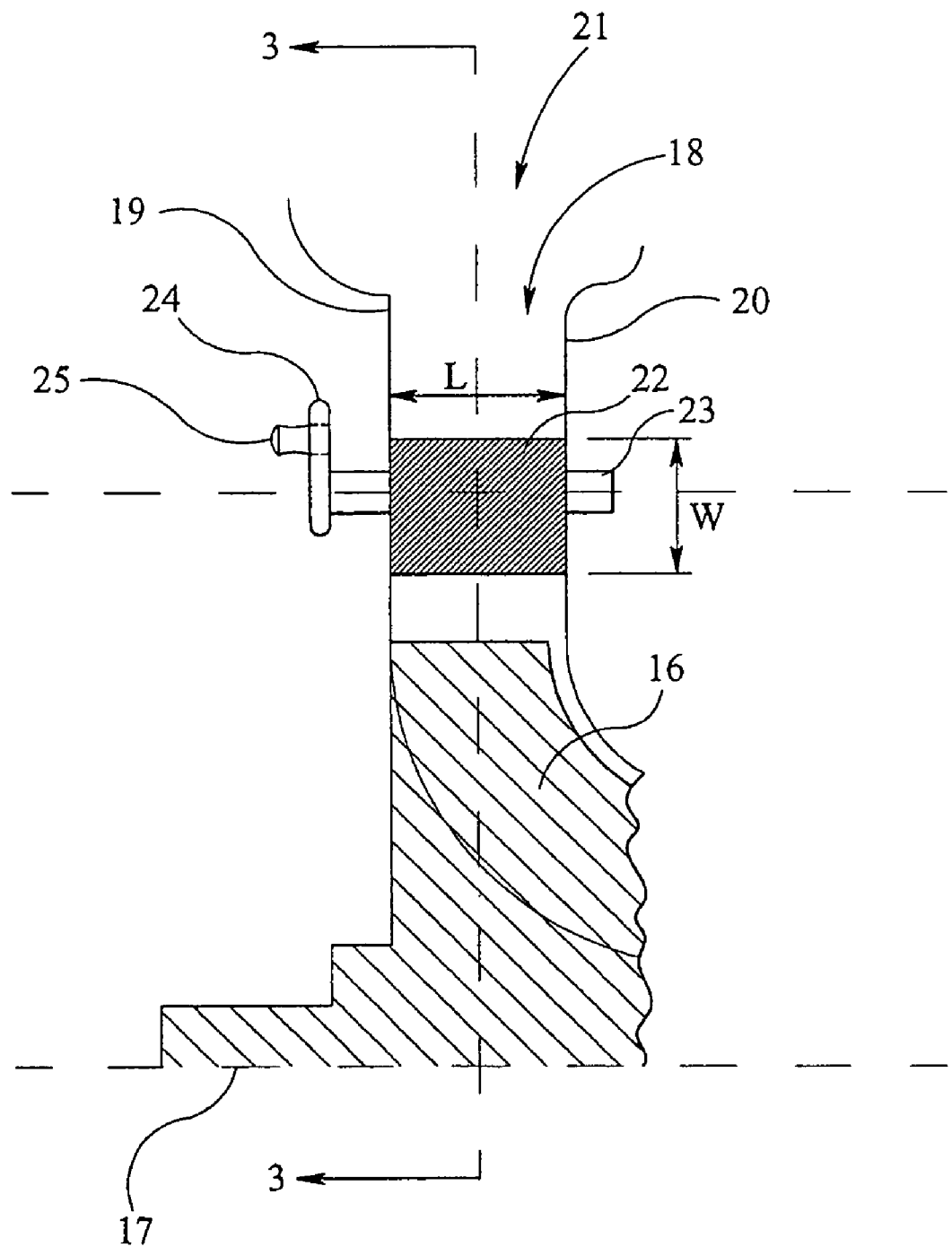
FIG. 2 is a schematic axial cross-section through part of a conventional swing vane variable geometry turbine.
Figure 3:
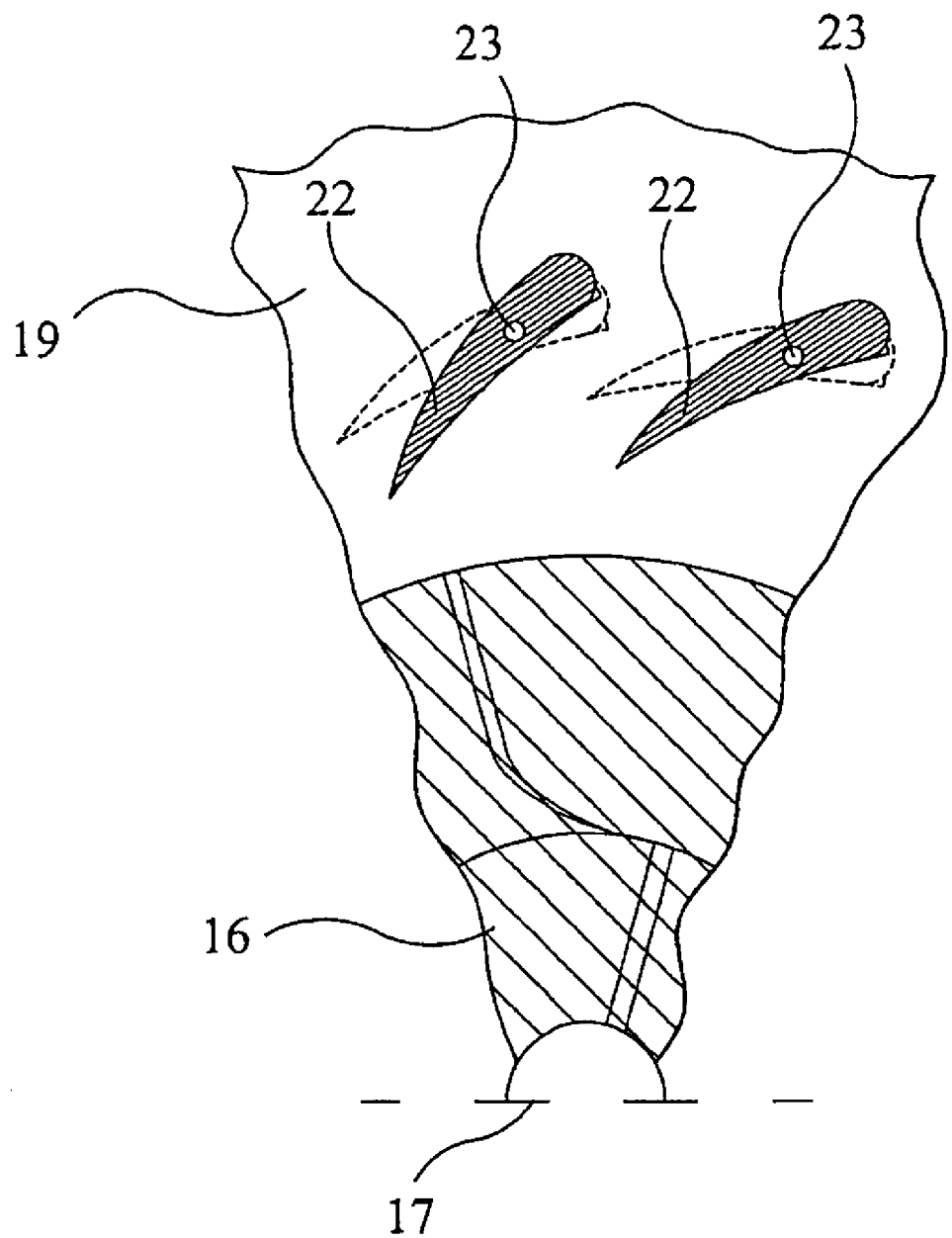
FIG. 3 is a section taken on the line 3-3 of FIG. 2 showing an axial view of the swing vane assembly.
Figure 4:
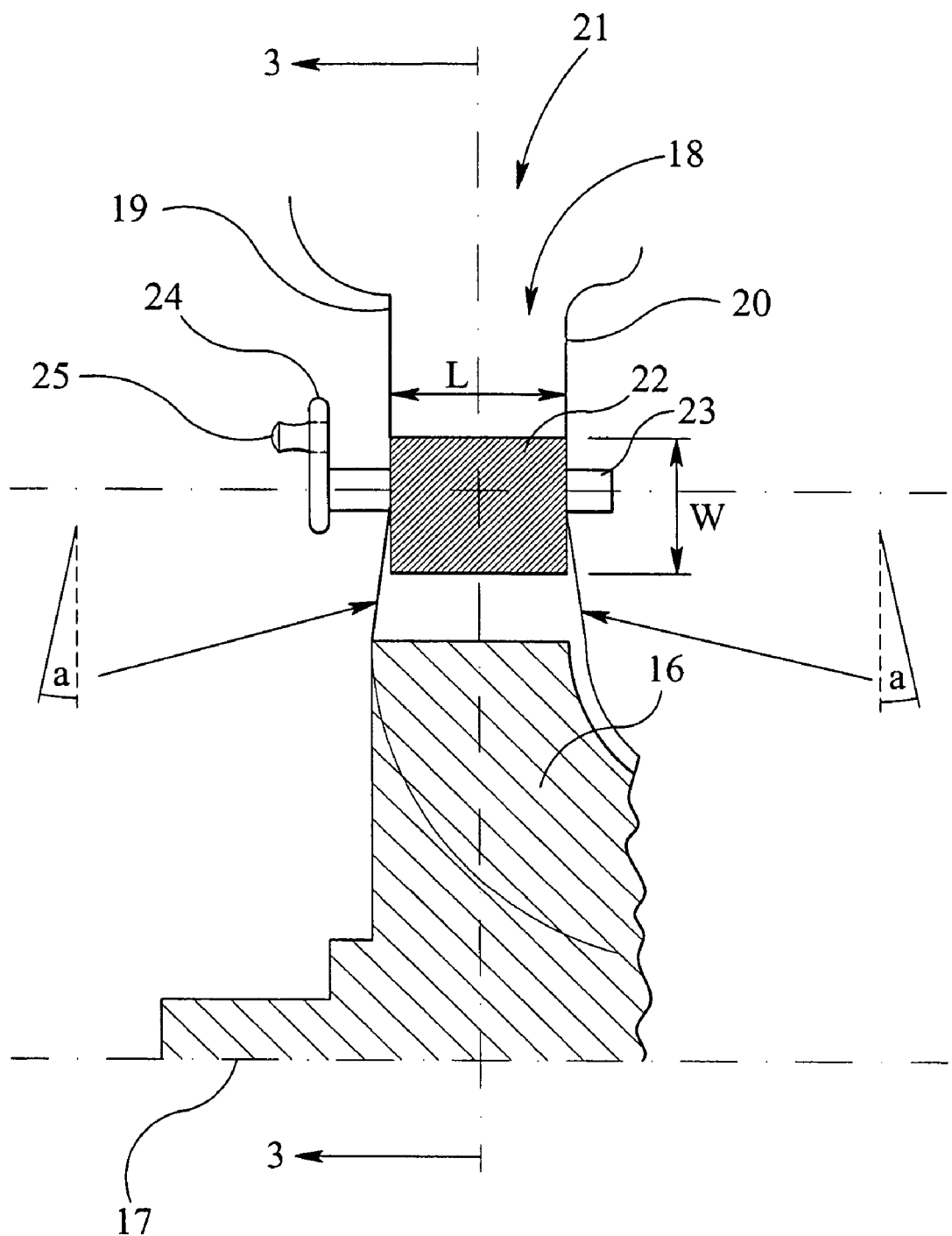
Figure 5:
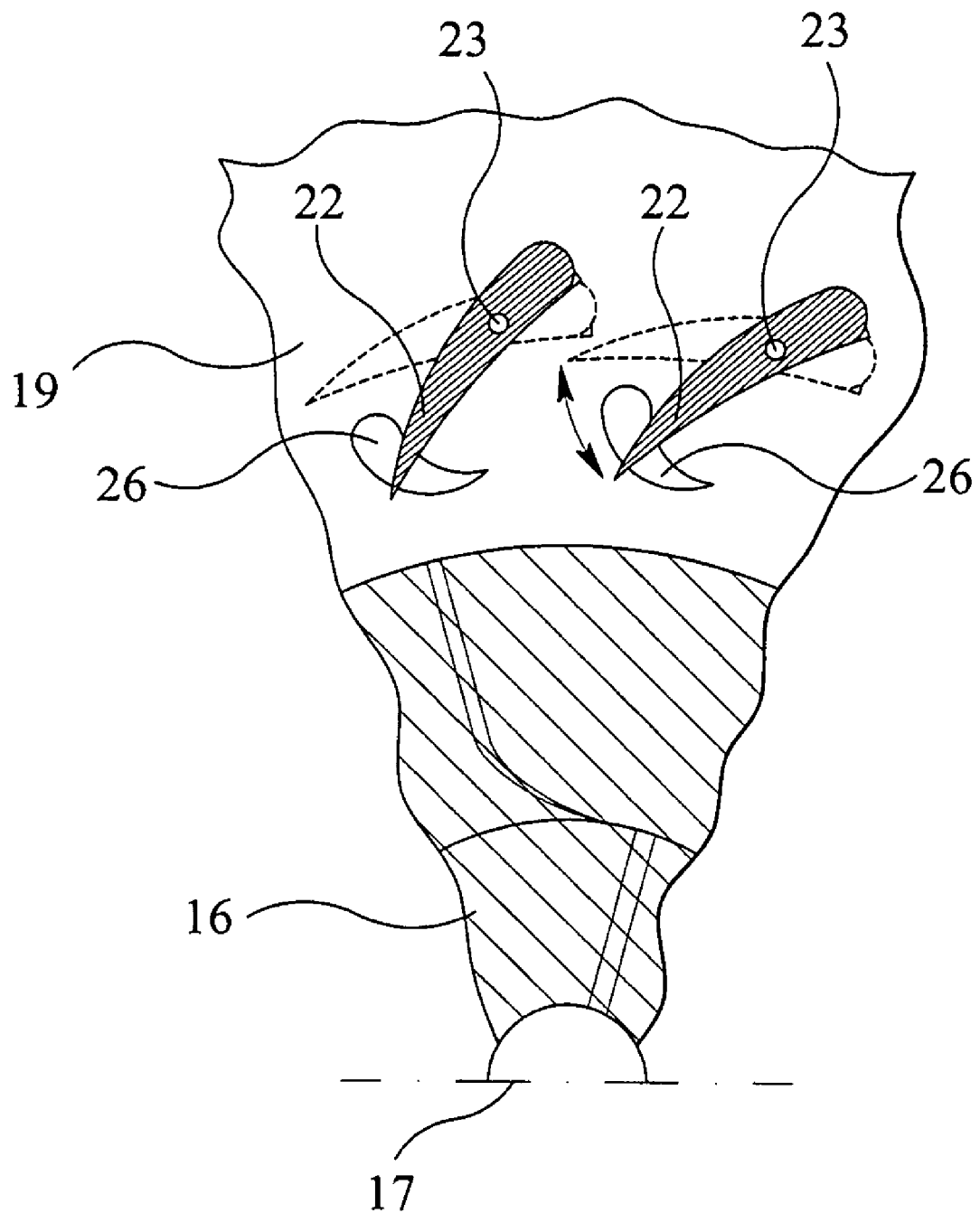
Figure 6:
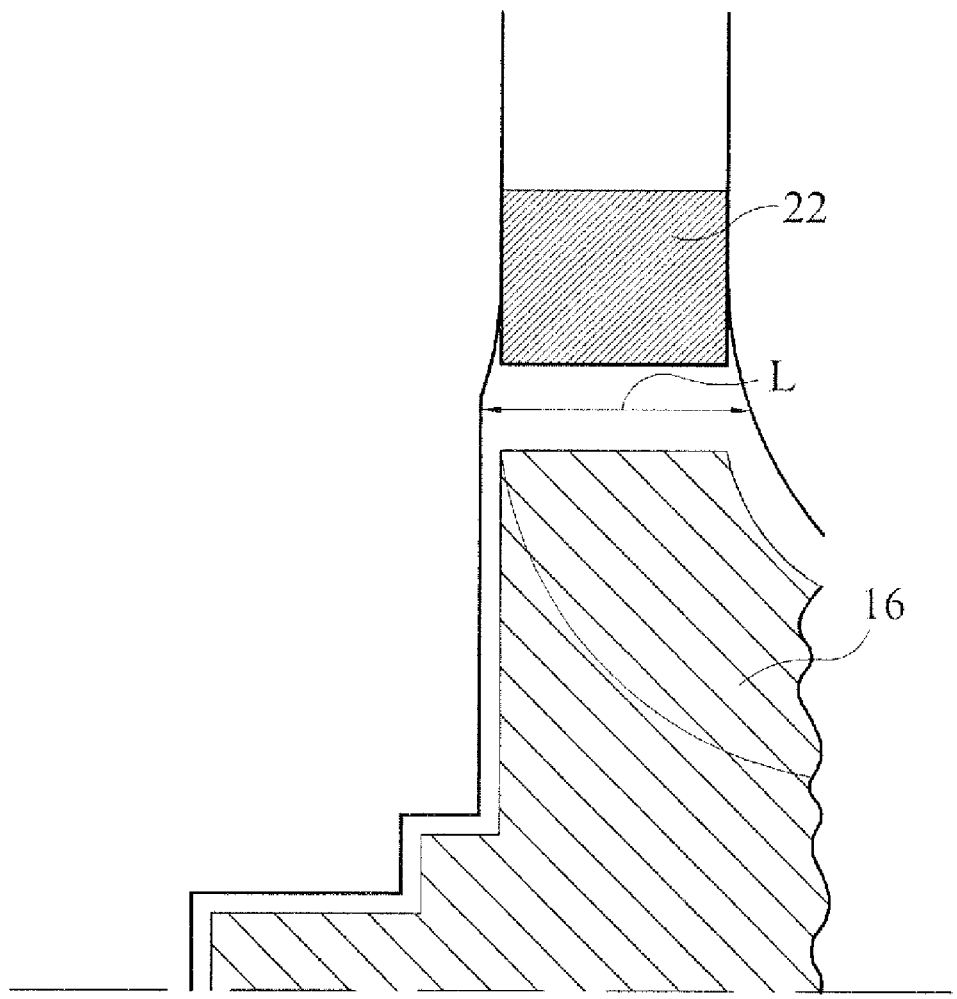
Figure 7:
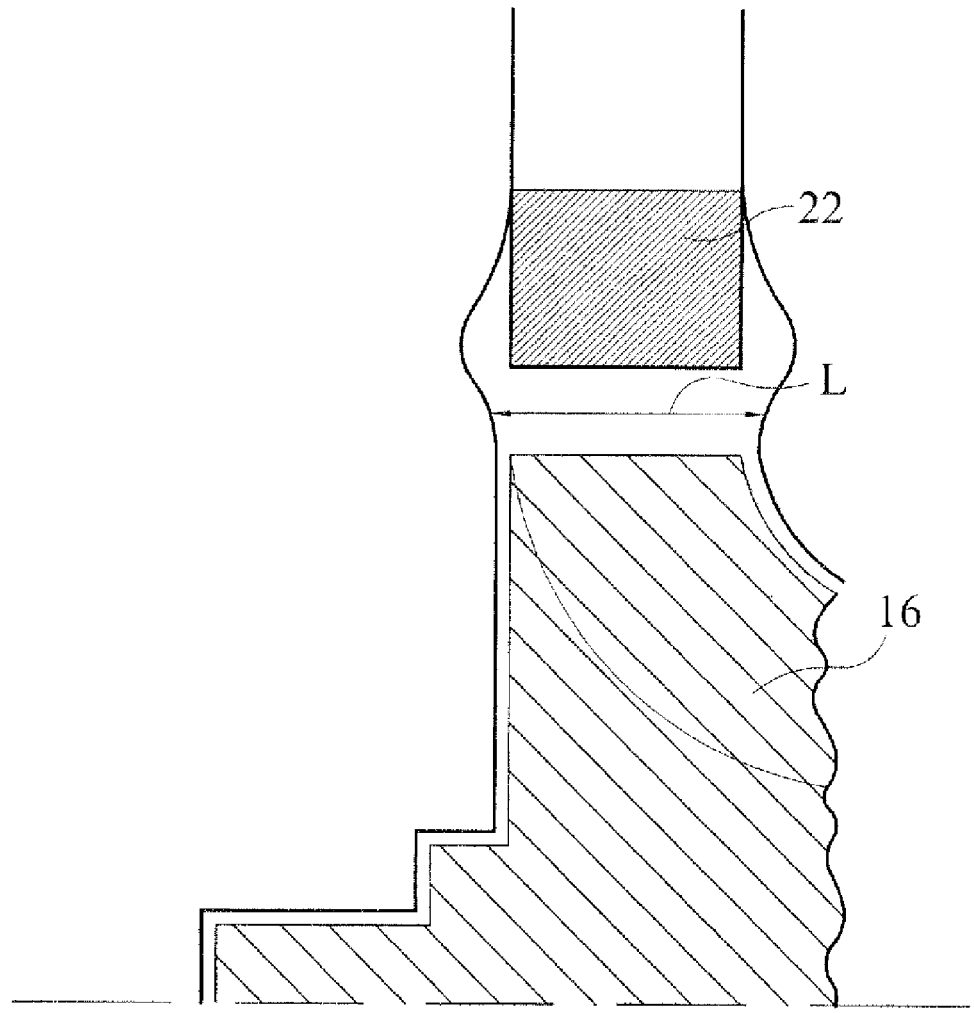
Figure 8:
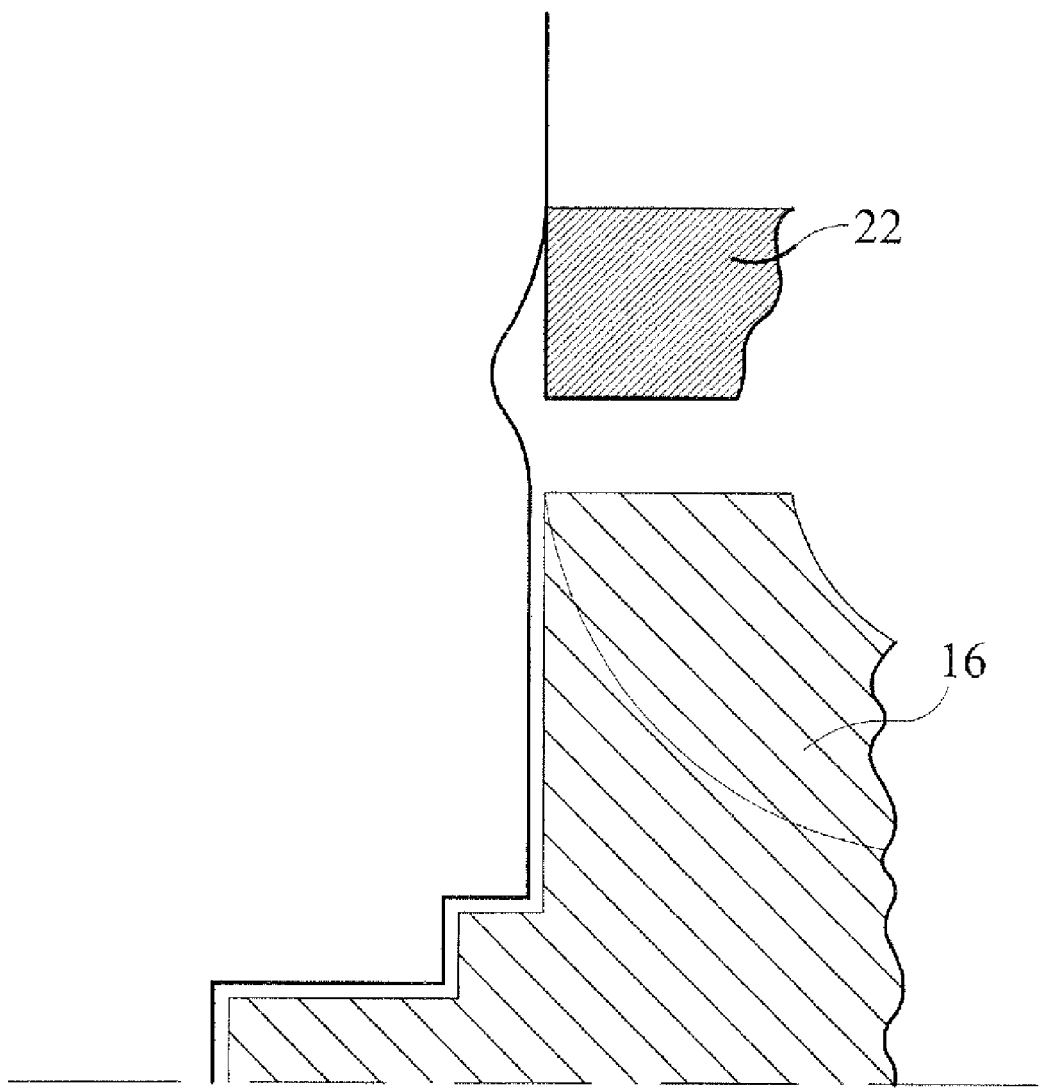
Figure 9:
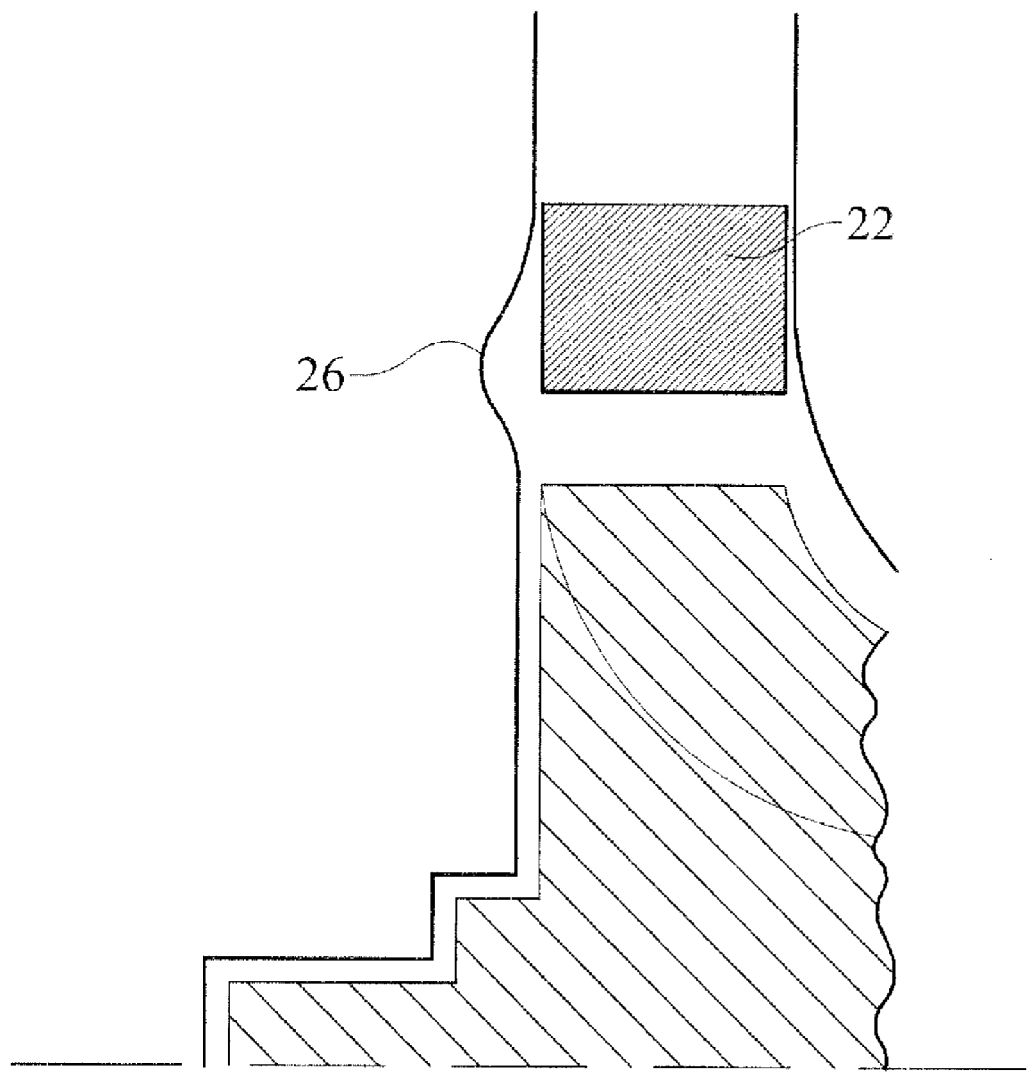
Figure 10:
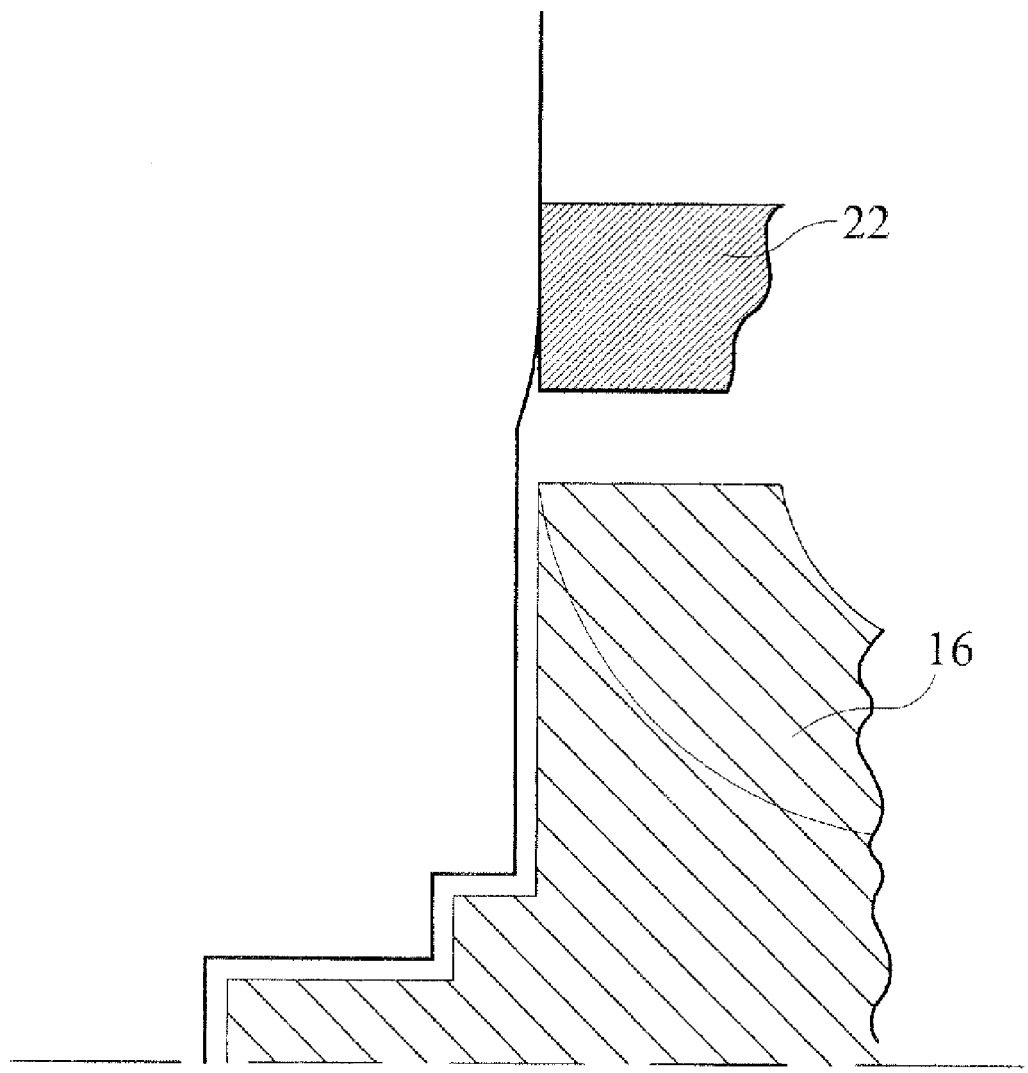

FIG. 4 schematically illustrates a modification of the swing vane turbine of FIGS. 2 and 3 and in accordance with a first embodiment of the present invention; and FIG. 5 schematically illustrates a modification of the swing vane turbine of FIGS. 2 and 3 in accordance with a further embodiment of the present invention.

FIGS. 6-10 show modifications of the swing vane turbine.

Figure 1:
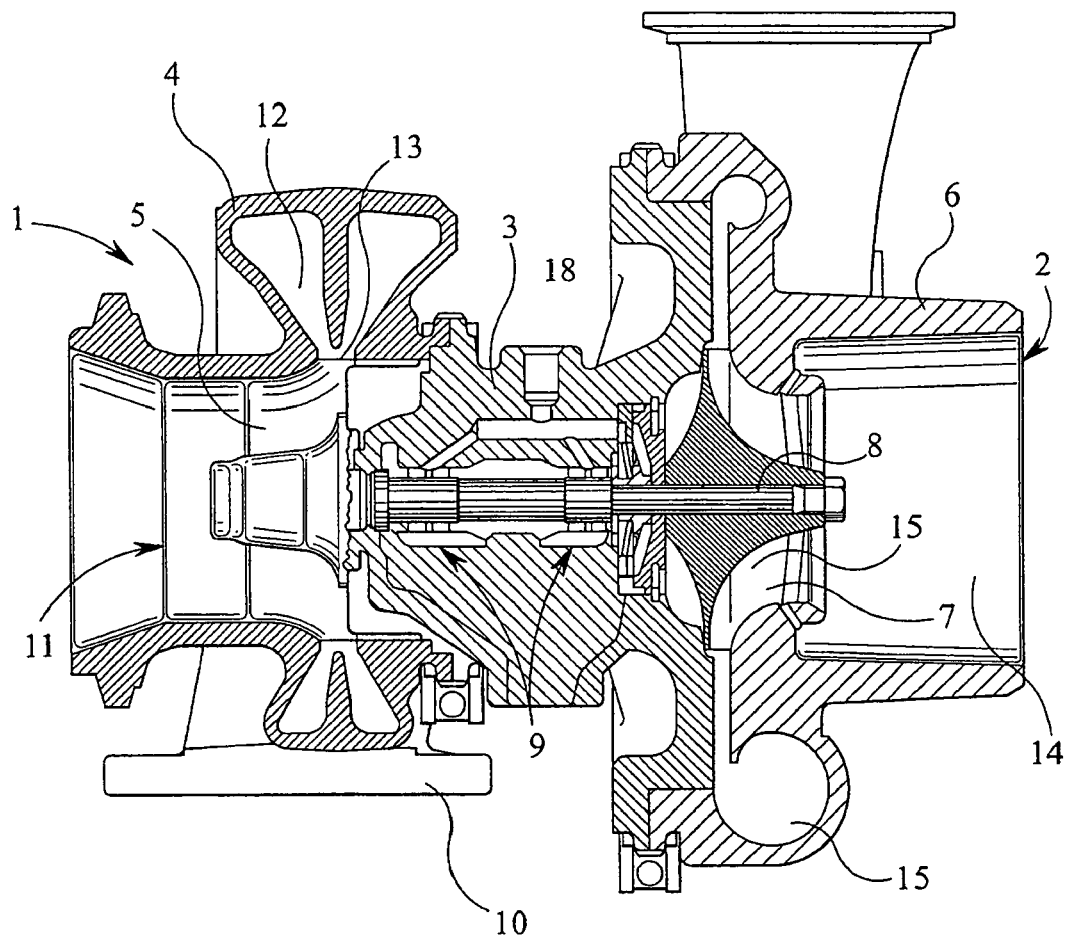
FIG. 1 is an axial cross-section through a turbocharger with a fixed geometry turbine which illustrates the basic components of a turbocharger.

FIG. 1 is an axial cross-section through a typical turbocharger with a fixed geometry turbine which illustrates the basic components of a turbocharger. The turbocharger comprises a turbine 1 joined to a compressor 2 via a central bearing housing 3. The turbine 1 comprises a turbine housing 4 which houses a turbine wheel 5. Similarly, the compressor 2 comprises a compressor housing 6 which houses a compressor wheel 7. The turbine wheel 5 and compressor wheel 7 are mounted on opposite ends of a common turbo shaft 8 which is supported on bearing assemblies 9 within the bearing housing 3.

The turbine housing 4 is provided with an exhaust gas inlet 10 and an exhaust gas outlet 11. The inlet 10 directs incoming exhaust gas to an annular inlet chamber, i.e. volute 12, surrounding the turbine wheel 5 and communicating therewith via a radially extending annular inlet passageway 13. Rotation of the turbine wheel 5 rotates the compressor wheel 7 which draws in air through an axial inlet 14 and delivers compressed air to the engine intake (not shown) via an annular outlet volute 15. Referring to FIGS. 2 and 3, these schematically illustrate part of conventional swing vane turbine comprising a turbine wheel 16 rotatable about an axis 17 within a turbine housing having an annular inlet passageway 18 defined between facing annular turbine housing walls 19 and 20 each of which lies in a plane normal to the turbine axis 17. Exhaust gases flow to the turbine wheel 16 from an inlet volute 21 via the inlet passageway 18.

Mounted within the inlet passageway 18 is an annular array of vanes 22 each of which is formed with a respective integral vane axle 23 that projects through the inlet walls 19 and 20, and one end of which defines a crank 24. An actuator (not shown) may be coupled to a pin 25 mounted on the crank 24 so as to control rotation of the vane 22 on the axle 6. In conventional arrangements the actuator will typically comprise a ring, referred to as a unison ring, rotation of which controls pivoting of all vanes simultaneously. Movement of the unison ring may be controlled by various forms of actuator, including pneumatic and electric actuators. Such details, which are not relevant to an understanding of the present invention, will be well known to the skilled person and will not be described.

In FIG. 2 the illustrated vane 22 is shown in a fully open position (i.e. maximum throat width) in which it extends substantially radially. In plan view as shown in FIG. 2 each vane 22 is substantially rectangular having an axial length L and a chordal width W. As shown in FIG. 2, it is conventional for the vanes 22 to have a length substantially equal to the axial width of the annular inlet passage 18 in order to minimise clearance between vane edges and the housing walls 19 and 20 defining the inlet passageway 18. This is to minimise gas leakage around the edges of the vanes which is detrimental to turbine efficiency.

Referring to FIG. 3, this shows two circumferentially adjacent vanes 22, each vane being shown in full line in one position in which the available cross section of the inlet (i.e. throat) is relatively large, and in dotted lines in an alternative position in which the throat is relatively small. The two positions shown in FIG. 3 lie somewhere between fully closed and fully open positions. It will be appreciated that the throat will be at a minimum when the vanes are in a closed position, i.e. extending substantially circumferentially, and will be a maximum when the vanes are in a fully open position, i.e. extending substantially radially with respect to the axis of the turbine as shown in FIG. 2. As the vanes 22 pivot between the fully open and fully closed positions, the vane edges sweep across radially extending portion of the inlet passageway walls 19 and 20.

In use, the gas flow to the turbine can be optimised for instantaneous operating conditions via appropriate adjustment of the positioning of the vanes 22 as is well known. It is also well known that as the vanes move from the closed position towards the open position there is an increase in efficiency due to inherent characteristics of the turbine. This can lead to problems as mentioned above with efficiency in some cases becoming too high to drive EGR flow for example. The present invention overcomes this problem by providing an inlet structure designed to reduce turbine efficiency for at least some vane positions, as compared with a conventional arrangement described above.

Referring now to FIG. 4, this illustrates a first embodiment of the present invention as a modification of the conventional swing vane turbine assembly illustrated in FIGS. 2 and 3. Features of FIG. 4 corresponding to features of FIGS. 2 and 3 are identified by the same reference numerals. From this it should be apparent that the illustrated embodiment of the invention differs from that of FIG. 2 in that the annular housing walls 19 and 20 defining the annular inlet passageway 18 are radially tapered from a radius close to that of the pivot radius of the vanes 22, so that the axial width of the inlet passage increases with decreasing radius, (embodiments of which can be seen in FIGS. 6 and 10). The tapering is axisymmetric so that the tapering is the same in the region of each vane 22. The effect of this is to vary the clearance between the annular side walls 19 and 18 and adjacent edges of the vanes 22 as they pivot between open and closed positions. That is, with the vanes in a closed position, extending substantially circumferentially, the clearance will be at a minimum and substantially constant along vane edges from the leading edge to the trailing edge of each vane (the leading edge of each vane being the edge extending across the inlet passageway 18 upstream relative to the direction of gas flow through the inlet passageway 18). However, as each vane 22 is pivoted towards an open position, the trailing edge of each vane will begin to sweep across the tapered region of the inlet passageway 18 so that the clearance between the vane and the passageway sidewalls 19 and 20 increases. The effect of this is to reduce the efficiency of the turbine as the vanes move further towards the open position as compared with a conventional turbine in which the clearance remains constant. This arrangement thus avoids the problems outlined above in relation to conventional swing vane turbine designs.

It will be appreciated that the precise effect on the turbine efficiency can be tailored by varying such features as the angle of taper (a) and the radius at which the side walls 19 and 20 begin to taper. For instance, if the tapering begins at a radius smaller than that illustrated in FIG. 4, the vanes 22 will have to swing further towards the open position before the tapering begins to affect efficiency. Similarly, for a given radius at which the taper begins, the angle of taper will effect the maximum clearance between the vane 22 and sidewalls 19 and 20 and thus the maximum effect on efficiency.

Whereas the sidewalls 19 and 20 of FIG. 4 taper linearly, it is possible to vary the rate at which efficiency is affected as the vanes swing towards the open position by increasing or decreasing the rate of taper with decreasing radius (so that the tapered portions of the side walls 19 and 20 are curved in axial cross-section) (embodiments of which can be seen in FIGS. 6-8 and 10). In some cases it may be appropriate for the angle of taper to first increase and then decrease, or vice versa.

It will be appreciated that each of the sidewalls 19 and 20 need not necessarily taper in the same way, for instance side wall 19 could taper at a different angle, and from a different radial starting point, than sidewall 20 depending on the desired effect on the efficiency of the turbine. Similarly, it will be appreciated that it may not be necessary to taper both sidewalls 19 and 20 but that the required reduction in efficiency could in some cases be achieved through tapering only one of the sidewalls 19 and 20, the other extending in a plane normal to the axis of the turbine.

A further embodiment of the present invention is illustrated in FIG. 5, again as a modification of the conventional swing vane turbine illustrated in FIGS. 2 and 3. FIG. 5 is an axial view corresponding to the cross-sectional view of FIG. 3 and the same reference numerals are used in FIG. 5 as in FIG. 3 where appropriate. With this embodiment of the invention the inlet passageway walls 19 and 20 are not tapered, but rather each lie in a plane normal to the axis 17 as with the conventional turbine of FIGS. 2 and 3. However, a varying clearance between vane 22 chordal edges and the inlet passageway side wall 19 is achieved by forming indentations, or pockets, 26 in the side wall 19 across which vanes 22 sweep as they move between open and closed positions. As illustrated in FIG. 5, in the fully closed position the trailing edge of each vane 22 is clear of the respective pocket 26. However, as each vane 22 moves towards an open position a point is reached at which the vane 22 begins to sweep across a radially outer extremity of a respective pocket 26 which thereby effectively opens up a leakage path around the portion of the edge of the blade, i.e. increasing the clearance between the vane 22 and the wall 19 along at least a portion of the edge of the vane 22.

The effect on the vane/side wall clearance, and thus turbine efficiency, can be tailored by appropriate positioning and profiling of the pockets 26. For instance, the circumferential width, and axial depth, of a pocket 26 at any given radius will determine the effective increase in clearance between a vane 22 and the side wall 19 for any particular vane position (i.e. determining the effective size of the leakage flow path around the vane edges). Accordingly, any desired effect on turbine efficiency can be achieved through appropriate dimensioning and positioning of the pockets 26 (an embodiment of which can be seen in FIG. 9). For instance, as shown in FIG. 5, the effect on the increase in clearance between each vane 22 and the side wall 19 will initially be a maximum at a relatively closed vane position, decreasing to a minimum as the vane moves to the fully open position. It would be more difficult to achieve the same effect by tapering of the inlet passageway walls as described in relation to the embodiment of FIG. 4.

Whereas the embodiment of FIG. 5 has pockets 26 formed in one side wall only of the inlet passageway 18, it will appreciated that similar pockets may also be formed in the other side wall 20 and that the pockets formed in each side wall may differ in relative position, dimension and shape to those formed in the other side wall.

Further modifications to the particular embodiments of the invention described above will be readily apparent to the appropriately skilled person

The invention claimed is:

1. A variable geometry turbine comprising:
    a turbine housing defining a turbine chamber within which a turbine wheel is mounted for rotation about a turbine axis;
    the turbine chamber having a radially extending annular inlet defined between facing annular side walls of the turbine housing, the annular inlet having an axial width defined between said annular side walls;
    an annular array of swing vanes mounted within the inlet, each vane having an axial length extending across the inlet between chordal vane edges lying adjacent respective annular side walls of the annular inlet, and a chordal length defined between leading and trailing vane edges extending across the inlet upstream and downstream respectively having regard to direction of flow through the turbine;
    means for pivoting each vane about a respective pivot axis extending across the inlet to adjust the effective cross-section area of the annular inlet, each vane being pivotable between a first position in which the area of the inlet is a minimum and a second position in which the area of the inlet is a maximum;
    wherein at least one of said annular side walls is configured so that clearance between said side wall and at least a portion of the adjacent chordal edge of each vane varies in a predetermined manner as the vane moves between positions intermediate said first and second vane positions;

wherein at least one of the annular side walls is configured so that the axial width of the annular inlet increases from a minimum width to a maximum width with decreasing radius; and wherein the variation in axial width of the annular inlet begins at a radius smaller than the radial position of the trailing edge of each vane when in said first position.

2. A turbine according to claim 1, wherein said at least one annular side wall is configured so that the clearance between the side wall and the adjacent chordal edge of each vane is substantially constant along the vane edge when the vanes are in said first position.

3. A turbine according to claim 1, wherein the rate of increase in axial width of the inlet with decreasing radius varies with decreasing radius.

4. A turbine according to claim 1, wherein the or each side wall is axisymmetrically contoured to produce said variation in axial width of the annular inlet.

5. A turbine according to claim 4, wherein the or each annular side wall is axisymmetrically tapered.

6. A turbine according to claim 5, wherein said taper is linear.

7. A turbine according to claim 5, wherein said taper is non-linear.

8. A turbine according to claim 1, wherein said at least one annular side wall is provided with a respective indentation for each vane, the indentation being formed in a portion of the surface of the annular wall member across which the respective vane sweeps in moving between said first and second positions, the indentation providing a gas leakage path around the adjacent vane chordal edge when the vane is at positions intermediate said first and second position corresponding to the location of the indentation.

9. A variable geometry turbine comprising:
a turbine housing defining a turbine chamber within which a turbine wheel is mounted for rotation about a turbine axis;
the turbine chamber having a radially extending annular inlet defined between facing annular side walls of the turbine housing, the annular inlet having an axial width defined between said annular side walls;
an annular array of swing vanes mounted within the inlet, each vane having an axial length extending across the inlet between chordal vane edges lying adjacent respective annular side walls of the annular inlet, and a chordal length defined between leading and trailing vane edges extending across the inlet upstream and downstream respectively having regard to direction of flow through the turbine;
means for pivoting each vane about a respective pivot axis extending across the inlet to adjust the effective cross-section area of the annular inlet, each vane being pivotable between a first position in which the area of the inlet is a minimum and a second position in which the area of the inlet is a maximum;
wherein at least one of said annular side walls is configured so that clearance between said side wall and at least a portion of the adjacent chordal edge of each vane varies in a predetermined manner as the vane moves between positions intermediate said first and second vane positions; and
wherein at least one annular side wall is provided with a respective indentation for each vane, the indentation being formed in a portion of the surface of the annular wall member across which the respective vane sweeps in moving between said first and second positions, the indentation providing a gas leakage path around the adjacent vane chordal edge when the vane is at positions intermediate said first and second position corresponding to the location of the indentation.

10. A turbine according to claim 9, wherein each indentation has the same size and shape.

11. A turbine according to claim 9, wherein the width of each indentation in a circumferential direction relative to the axis of the turbine varies with radius relative to the axis of the turbine.

12. A turbine according to claim 9, wherein the axial depth of each indentation varies with radius relative to the axis of the turbine.

13. A turbine according to claim 9, wherein each indentation is confined to a radial region of the respective annular side wall defined between the radial position of the trailing edge of each vane when each vane is a first intermediate position between said first and second positions, and an inner radial edge of the respective annular wall member.

14. A turbine according to claim 9, wherein both of said annular side walls are provided with said indentations.

15. A turbine according to claim 9, wherein said at least one annular side wall is configured so that the clearance between the side wall and the adjacent chordal edge of each vane is substantially constant along the vane edge when the vanes are in said first position.

16. A turbine according to claim 9, wherein the or each annular side wall is configured so that the axial width of the inlet increases from a minimum width to a maximum width with decreasing radius.

17. A variable geometry turbine comprising:
a turbine housing defining a turbine chamber within which a turbine wheel is mounted for rotation about a turbine axis;
the turbine chamber having a radially extending annular inlet defined between facing annular side walls of the turbine housing, the annular inlet having an axial width defined between said annular side walls;
an annular array of swing vanes mounted within the inlet, each vane having an axial length extending across the inlet between chordal vane edges lying adjacent respective annular side walls of the annular inlet, and a chordal length defined between leading and trailing vane edges extending across the inlet upstream and downstream respectively having regard to direction of flow through the turbine;
means for pivoting each vane about a respective pivot axis extending across the inlet to adjust the effective cross-section area of the annular inlet, each vane being pivotable between a first position in which the area of the inlet is a minimum and a second position in which the area of the inlet is a maximum;
wherein at least one of said annular side walls is configured so that clearance between said side wall and at least a portion of the adjacent chordal edge of each vane varies in a predetermined manner as the vane moves between positions intermediate said first and second vane positions; and
wherein said variation in clearance between the side wall and said portion of the adjacent chordal edge of each vane begins at a radius smaller than the radial position of the trailing edge of each vane when in said first position.

* * * * *